(12) United States Patent
Shivvers

(10) Patent No.: US 6,923,389 B2
(45) Date of Patent: Aug. 2, 2005

(54) UNIFORM GRAIN SPREADER

(75) Inventor: Steve D. Shivvers, Prole, IA (US)

(73) Assignee: Shivvers, Inc., Corydon, IA (US)

( * ) Notice: Subject to any disclaimer, the term of this patent is extended or adjusted under 35 U.S.C. 154(b) by 143 days.

(21) Appl. No.: 10/228,733

(22) Filed: Aug. 27, 2002

(65) Prior Publication Data

US 2004/0046071 A1 Mar. 11, 2004

(51) Int. Cl.$^7$ .............................................. A01C 17/00
(52) U.S. Cl. ..................... 239/681; 239/680; 239/687; 239/682
(58) Field of Search ................................ 239/680, 681, 239/682, 687, 679, 666, 688, 689

(56) References Cited

U.S. PATENT DOCUMENTS

| | | |
|---|---|---|
| 350,821 A | 10/1886 | Field |
| 2,538,886 A | 1/1951 | Skibbe et al. |
| 2,690,827 A | 10/1954 | Wiggins |
| 3,189,355 A | 6/1965 | Swenson et al. |
| 3,232,458 A | 2/1966 | Freeman |
| 3,349,930 A | 10/1967 | Welborn |
| 4,108,384 A | 8/1978 | Egli |
| 4,120,410 A | 10/1978 | van der Burgt |
| 4,326,673 A | 4/1982 | Thene |
| 4,397,423 A | 8/1983 | Beaver et al. |
| 4,437,613 A | 3/1984 | Olson |
| 4,564,328 A | 1/1986 | Loutaty et al. |
| 4,718,811 A | 1/1988 | Stoltzfus |
| 4,972,884 A | 11/1990 | Souers et al. |
| 5,296,202 A | 3/1994 | Souers et al. |
| 5,372,467 A | 12/1994 | Harris |
| 5,393,189 A | 2/1995 | Berquist |
| 5,403,141 A | 4/1995 | Rauser |
| 5,501,405 A * | 3/1996 | Doornek ..................... 239/683 |
| 5,558,484 A | 9/1996 | Mikulicz et al. |

OTHER PUBLICATIONS

Brochure Bin–Level Automatic Control Grain Spreader, by DMC.
Brochure Power Grain Diverter, by DAR–VIC.
Brochure Electric Spread–Master, by National Equipment, Inc., 1983.
Brochure AgriDry Grain Spreaders & Bullseye Controllers, by AgriDry, Inc.
Brochure Winfield Grain Powered Grain Spreader, by Winfield.
Brochure Spreader, by Betterco Mfg.
Brochure Hi–Capacity Grain Hog, by Shivvers, Inc.
Brochure Scattergrain Models, by Farm Fans.
Brochure Spinning Gravity Grain Spreader, by Spread–All Mfg. Co., Jan. 2, 1995.

* cited by examiner

Primary Examiner—Thomas Denion
Assistant Examiner—Diem Tran
(74) Attorney, Agent, or Firm—John C. McMahon

(57) ABSTRACT

A grain spreader includes a vertical shaft, a receiver for receiving the grain and distributing the grain to a diverter that is rotatably mounted on the shaft with an outlet that is eccentrically positioned relative to the shaft, and a spreader pan that receives the grain form the distributer. The spreader pan is mounted to rotate on the shaft beneath the diverter. The diverter and the spreader pan are rotated by controllable motors so that the diverter can be stopped and the rotational speed of the spreader pan can be varied. The spreader pan has a bottom base and a series of varying length vanes that are vertically and radially aligned on the base to operably engage the grain and spread the grain within a bin or the like. The lengths of the vanes are preferably determined by a formula. In certain embodiments the spreader pan may have an opening to allow grain to pass through the pan without engaging the base so as to fill the center of a bin more evenly.

24 Claims, 4 Drawing Sheets

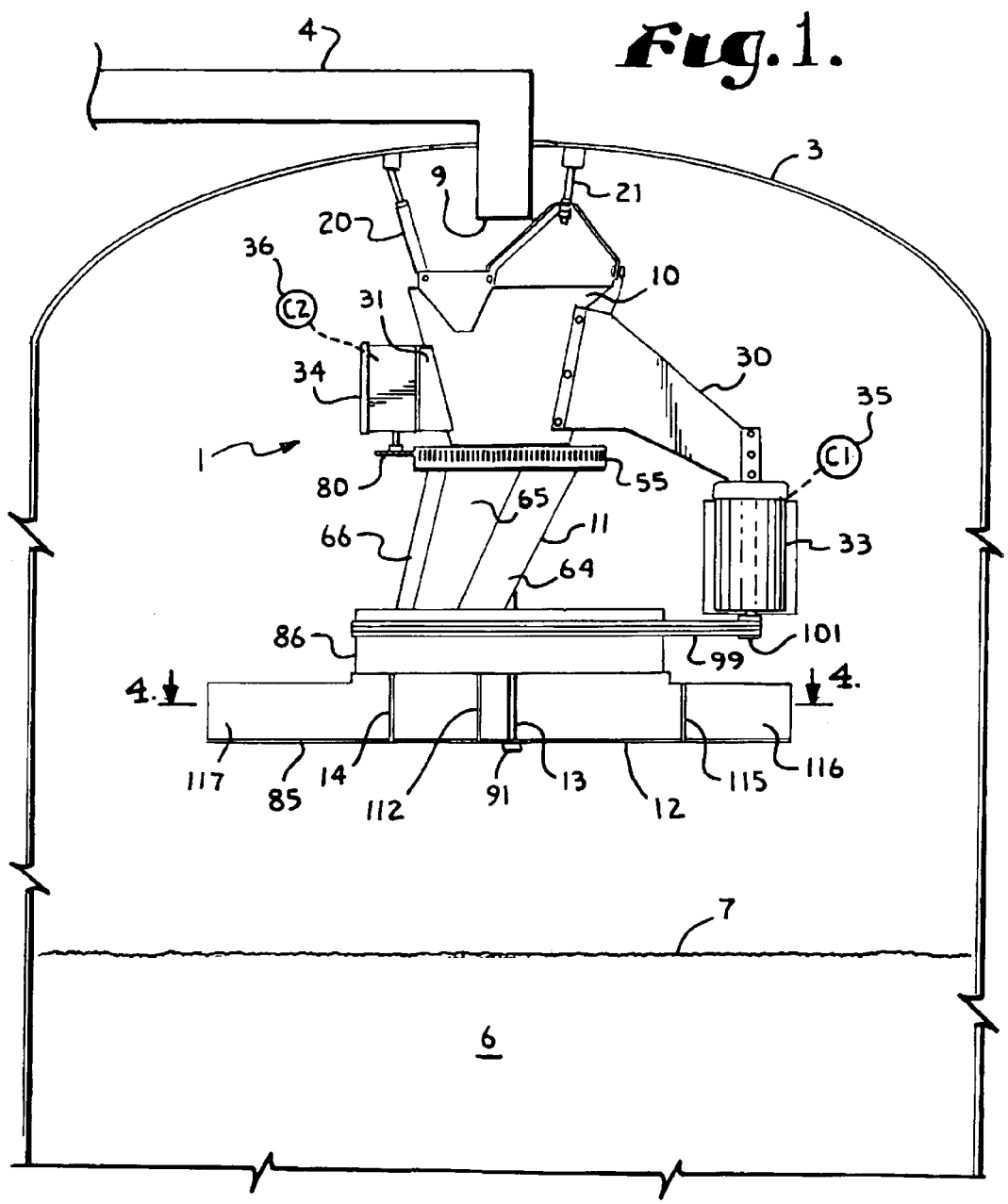

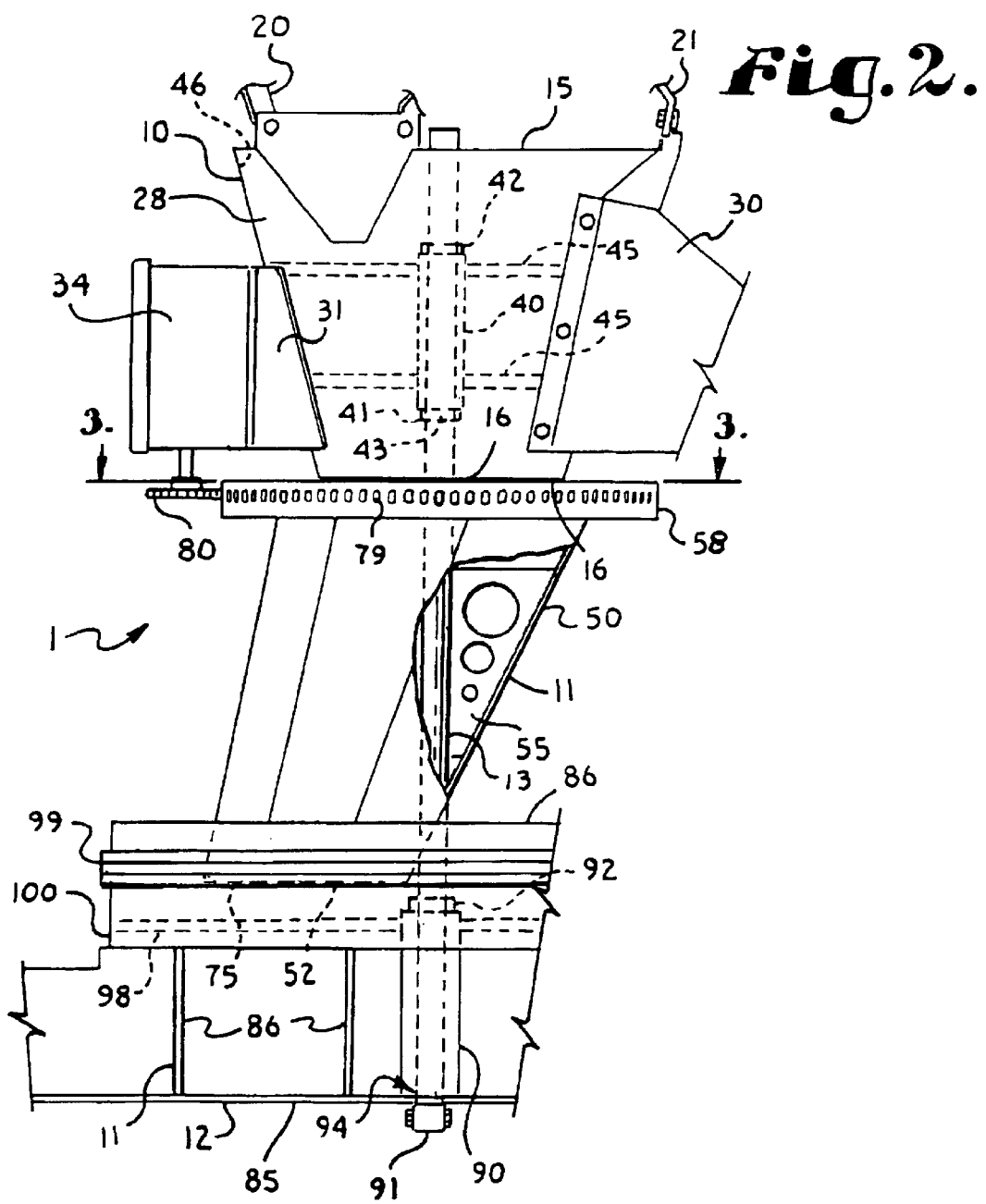

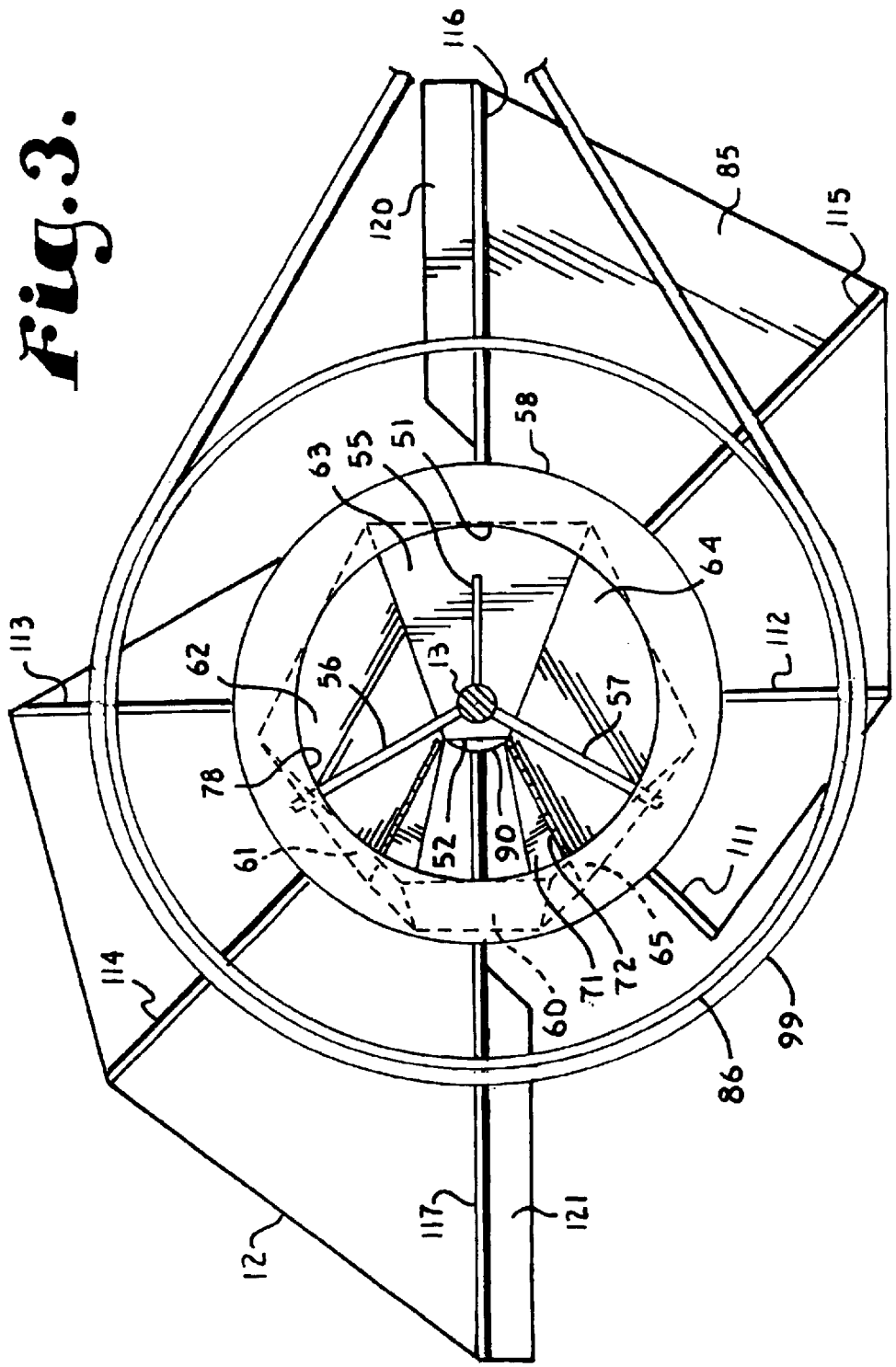

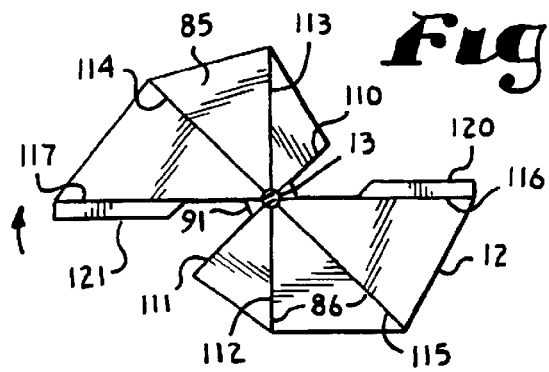

UNIFORM GRAIN SPREADER

BACKGROUND OF THE INVENTION

The present application is directed to a grain spreader for evenly distributing grain or the like within a storage bin and, in particular, to such a spreader that provides for even spread of grain with respect to annular rings within the bin, as well as even distribution along each annular ring. The spreader also allows correction of nonuniform regions within the bin that are caused by nonuniform drying of the grain entering the bin or the like.

Grain is normally conveyed into the top of the storage bin during the bin filling process. Because the grain has an angle of repose, if the grains is not spread, it normally tries to mound beneath the delivery point. If this is allowed to occur, the bin will fill all of the way to the grain inlet above the mound leaving large portions of the bin unfilled. In the early days of a grain storage in such bins, farmers had to actually enter the bin and shovel the grain to a uniform level. Later, there were many attempts made to provide a spreader that operably distributed the grain in a manner to try to level the top of the grain. Such spreaders met with varying degrees of success. However, even a very good spreader is often plagued by grain having varying degrees of wetness or the like, such that it does not deposit evenly within the bin. In such situations it is still necessary to be able to make some adjustments to the distribution of incoming grain to fill one or more concentric annular rings having vertical axes within the bin or sections of rings within a partially filled bin.

In order to perfectly fill a bin, it would be necessary to have perfectly uniform grain and to impart to each particle of grain a continuously varying momentum or velocity that varies infinitely during filling and projects the particles in continuously rotating arcs over the radius of the bin. In practice it is not possible to provide a constantly changing and infinitely variable momentum to the particles of grain. However, it is desirable to provide a spreader pan having variable length vanes that are sized in accordance with a formula intended to impart velocities to the grain that produce generally uniform concentric rings within the bin, where the level of such grain becomes increasingly more uniform as the number of vanes increases.

In certain instances it is desirable to have the spreader pan be balanced by vanes of equal length or by providing a pattern of non equal length vanes that balances the spreader pan as much as possible.

SUMMARY OF THE INVENTION

A spreader for evenly distributing grain or the like in a bin or silo includes a receiver for receiving the grain from a transport tube or equivalent delivery system and thereafter gravity feeding the grain to a diverter. The diverter rotates about an axis so as to eccentrically and evenly distribute the grain from a distribution opening to a spreader pan. The spreader pan rotates on a shaft common with the diverter.

Normally, the diverter rotates at a comparatively slow speed of about 1 to 3 revolutions per minute. The spreading pan normally rotates at a faster comparative speed that is determined by the diameter of the spreading pan as chosen by the designer, the radius of the bin being filled and the height of the grain within the bin at any given time. Preferably, the spreading pan rotates in the range of about 30 to 260 revolutions per minute and most preferably in the range from 30 to 100 revolutions per minute. Preferably, the speed of rotation of the diverter and spreader pan are each independently controllable, so that adjustments can be made in the distribution of grain that results from incorrect usage of the spreader, differences in height of grain in the receiving bin during filling and inconsistencies in the grain being spread such as wetness.

In particular, the diverter may be stopped so as to have the distribution therefrom located in association with a specific angular sector of the bin to fill a low spot in such a sector (normally the diverter is stopped slightly upstream of the low spot) or the spreader pan may be varied in rotational speed to adjust for grain level in the bin or to place more or less grain in various concentric rings in the bin. As the pan rotational speed is increased, the grain is preferentially spread further radially out in the bin. The spreading pan has a flat bottom or base with a series of upright and radially extending vanes thereon. Preferably, at least some of the vanes are of different length. The grain particles are given velocity or momentum by the vanes in accordance with the length of the vanes, so longer vanes throw or propel the grain to further out annular rings in comparison to shorter vanes. Also, preferably the vanes are in a set with the length of the maximum length vane being chosen by the designer and each other selected vane having a length that is determined by the following equation:

the length of a particular non-maximum length vane equals the length of the maximum length vane times the square root of an angle in degrees (that is, for example 45, 90, 135 etc. degrees) based on the relative position of the respective vane compared to a starting position divided by the square root of A in degrees where A is 360 or a whole number division of 360 based upon the number of groups of vanes desired. It is desirable in some situations to size the vanes according to the noted formula and then redistribute them on the base in a manner so that pairs of the vanes closest in size to one another are located across from each other so as to better balance the spreading pan.

The maximum length vane is normally selected by the designer to best work with respect to the width of the bin to spread the grain near the radially outer part of the bin. The speed of rotation of the spreader is adjusted to further fine tune the location where the grain falls after leaving the spreader pan.

The vanes may thus be located on the pan base in a pattern of ever increasing length in a pattern similar to a nautilus shell or, alternatively, the vanes may be split into two groups with the groups being placed on opposite sides of the pan in order to better balance the pan.

The vanes may also be sized according to the formula and then mounted in the base, so that at least some vanes of similar length are positioned opposite each other to better balance the pan.

In order to get perfect distribution under perfect conditions, there would have to be an infinite number of vanes which is not practical nor would such leave space for the grain, so a fewer number is chosen. Normally, an even number that can easily be divided and located on the pan such as 8, 16, or the like. One relatively effective pattern uses eight vanes to divide the pan into eight angularly equal sectors of 45 degrees each. Thus, the first vane is calculated at the equivalent angular spacing of 45°, the second at 90°, etc. The vanes may then be assembled in size order, in split groups in size order or distributed to better balance the pan. In some circumstances it is also necessary to remove a portion of the base between at least one pair of relatively short vanes to allow grain to fall straight through, as empirical testing has shown that too much downward momentum is delivered to the grain as it falls from the diverter which is converted to radial momentum, if allowed to strike the base of the pan, which in turn causes such grain to be directed outside the center of the bin. Removal of the noted portion of the base resolves this problem.

OBJECTS AND ADVANTAGES OF THE INVENTION

Therefore; the objects of the present invention are: to provide a grain spreader that receives grain near the top of a grain bin and then distributes the grain in an uniform pattern so that the grain accumulates in a substantially level or even pattern or at least in a pattern that would otherwise be level, if not for outside influences such as varying grain wetness; to provide such a spreader having a rotatable spreading pan and a rotatable diverter located above the pan; to provide such a spreader including wherein the rotatable diverter is controllable and has a discharge opening or outlet that distributes grain on the pan in a uniform ring when the diverter and pan are each rotating at constant speeds; to provide such a spreader wherein the pan and diverter are each rotatable at variable speeds and at different speeds relative to each other to adjust for grain heights in annular concentric rings within the bin; to provide such a spreader wherein the diverter is stoppable to allow selective filling of a particular angular segment or sector of the bin to accommodate inconsistencies in the grain due to relative wetness or the like; to provide such a spreader wherein the spreader pan includes a base with a generally planar upper surface with a series of radially aligned upright blades mounted thereon and wherein the length of the blades are varied to control the spread pattern of the grain; to provide such a spreader wherein the vanes have a length determined in accordance to a preferred formula; to provide such a spreader wherein the vanes are arranged sequentially from shortest to longest; to provide such a spreader having an alternative pan wherein the vanes are arranged in two groups on opposite sides of the pan with vanes ranging from shortest to longest on each side; to provide a spreader with yet another alternative vane pattern wherein the vanes are located such that vanes of about the same length are generally opposite one another; to provide such a spreader wherein a portion of the pan base that is located between two relatively short vanes is removed so as to allow grain to fall straight through and more evenly fill the center of the bin; and to provide such a spreader that is easy to use and especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, cross-sectional and side elevational view of a grain storage bin with a grain spreader in accordance with the present invention.

FIG. 2 is a fragmentary side elevational view of the spreader with portions broken away to illustrate detail thereof.

FIG. 3 is a cross-sectional view of a diverter and spreading pan of the spreader, taken along line 3—3 of FIG. 2.

FIG. 4 is a somewhat schematical cross-sectional view of the spreading pan, taken along line 4—4 of FIG. 1 with vanes of the spreading pan shown as single lines as in the following views.

FIG. 5 is a cross-sectional view similar to FIG. 4 showing a first alternative spreading pan.

FIG. 6 is a cross-sectional view similar to FIG. 4 showing a second alternative spreading pan.

FIG. 7 is a cross-sectional view similar to FIG. 4 showing a third alternative spreading pan.

FIG. 8 is a cross-sectional view similar to FIG. 4 showing a fourth alternative spreading pan.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a grain spreader in accordance with present invention. The spreader 1 is illustrated mounted in a grain bin 3 that receives grain 6 from a transport tube 4. The grain 6 collects in the bin 3 and has an upper surface 7.

The transport tube 4 is a conventional device for conveying grain to the bin 3 and includes a discharge mouth 9 that is located above the spreader 1. The transport tube 4 can be of an auger type, an airstream type or any other suitable type.

The spreader has an upper grain receiving cone or receiver 10, a grain diverter 11, a spreader pan 12 and a shaft 13.

The receiver 10 may have various shapes while serving the purpose of receiving grain 6 from the tube 4 and uniformly distributing the grain 6 through an outlet or discharge opening 16. The receiver 10 is centrally hollow with an upper inlet opening 15 and centrally open to the outlet opening 16. Preferably, the inlet opening 15 is larger than the outlet opening 16 to encourage collection of some grain 6 in the receiver 10 and an even distribution of grain through the outlet opening 16.

Hangers 20 and 21 support the receiver 10 from the top of the bin 3 directly under the tube 4 so as to receive the grain 6 through the inlet opening 15. The receiver 10 is best adjusted relative to the bin 3 such that the discharge opening 16 is in a horizontal plane and so that the tube 4 discharges the grain vertically down relative to the inlet opening 15.

Mounted on an outer surface 28 of the receiver 10 are a first motor mount 30 and a second motor mount 31. Suspended from distal ends of the motor mounts 30 and 31 are motors 33 and 34 which are electrically operated under the control of controllers (C1 and C2) 35 and 36 respectively. The controllers 35 and 36 are preferably physically located outside the bin 3, so as to allow easy access to an operator. The motor 33 is also preferably variable speed motor and the speed of operation thereof can be controlled by the controller 35. The motor 34 is stoppable and can be controlled by the controller 36.

The shaft 13 is mounted in the receiver 10 so as to be vertically aligned and generally coaxial with the openings 15 and 16. The shaft 13 is freely rotatably received in an upper bearing 40 and held in place thereon by collars 41 and 42 that are secured to the shaft 13 by set screws 43. The collars 41 and 42 can be positioned at different selected locations along the shaft 13 to allow for adjustment in length of the portion of the shaft 13 below the collar 41. The bearing 40 is supported in the receiver 10 by spokes or struts 45 that are fixed to an interior surface 46 thereof.

The diverter 11 is suspended below the receiver 10 and fixed to the shaft 13, so that the diverter 11 rotates relative to the receiver 10. It is foreseen that the shaft 13 could alternatively be fixed relative to the receiver 10 and that the diverter 11 rotate on the shaft 13.

The diverter 11 has an elongate chute 50 with an open interior and with an upper opening 51 and a lower opening 52.

The chute 50 is fixedly attached to the shaft 13 by a gusset 55 and a pair of spokes 56 and 57. Attached to the chute 50 near the upper opening 51 is a drive ring 58. The chute 50 has six walls 60,61,62,63,64 and 65 that are sized and aligned to converge the chute 50 between the upper opening 51 and the lower opening 52. In this manner, grain 6 backs up somewhat in the chute 50 so that an even and uniform flow exits the lower opening 52. A choke 70 is provided at the lower opening 52 that includes flaps 71 that are attached by hinges 72 to the chute 50 at the lower opening 52. The flaps 71 are adjusted, preferably at installation of the spreader 1 to maintain even distribution of grain 6 exiting the opening 52 which adjustment is determined mainly by the flow through the tube 4.

The chute 50 has an upper opening 51 that is generally coaxially located relative to the shaft 13, as can be seen in FIG. 3. The chute 50 also has a lower end 75 that is off-center or eccentric relative to the shaft 13, such that the chute 50 is at an angle relative to the shaft 13, as is best seen in FIG. 2, and so that the lower opening 52 rotates about the shaft 13 in a non coaxial or eccentric manner whereby grain is discharged from the lower opening in a ring when the diverter 11 is rotating. Preferably, the lower opening 52 discharges grain 6 as it rotates in a ring that is at least slightly spaced radially outward from the shaft 13. However, the ring of discharge of grain which is equal in width to the radial width of the lower opening 52, may have a zero inner radius, if it abuts the shaft 13.

The chute drive ring 58 is securely fixed to the chute 50 and rotates coaxially with respect to the shaft 13. The drive ring 58 is cylindrical in shape and has an internal opening 78 that is close in cross sectional area to the chute upper opening 51. Positioned about the drive ring 58 are a series of spaced gear receiving apertures 79 that engage cogs on a gear 80 that is operably driven by the motor 34. In this manner the gear 80 engages the apertures 79 sequently and rotates the drive ring 58. Normally, the drive ring 58 is rotated at about 1 to 3 revolutions per minute, but the speed is determined by the designer and slower and faster speeds can be used. A comparatively slow rotation of 1 RPM has been found to provide an even distribution of the grain 6. The motor 34 can also be stopped completely so that the chute outlet opening 52 stays on one side of the spreader when it is desirable to fill a specific area of the bin 3 that has not properly filled for some reason such as wetness of the grain.

It is foreseen that other types of diverters that serve the desired functions may be used such as rotating vertically aligned screw or a tub with one or more radially outward openings.

The spreader pan 12 is located beneath the chute 50 so as to receive grain 6 therefrom. The spreader pan 12 has a base or bottom plate 85, a plurality of vanes 86 that are vertically fixed to and extend upwardly from the plate 85 and an upper drive ring 86. The vanes 86 are sized and shaped to provide a preselected distribution pattern for the grain 6 which will be discussed more extensively below. In general, the vanes 86 extend radially out from the shaft 13 and the bottom plate 85 is generally sized to conform with the length of the vanes 86 except where necessary to allow free fall of the grain 6.

The spreader pan 12 includes a bearing unit 90 that is centrally located with respect to the spreader pan 12 and which is sleeved on the shaft 13 and includes various internal bearing elements. The bearing unit 90 is held in place by collars 91 and 92. The shaft 13 passes through an opening 94 in the pan bottom plate 85 with the collar 91 located on an under side of the bottom plate 85.

The ring 86 is cylindrical and spaced from the bearing unit 90 and shaft 13 by spokes 98. The ring 86 thus rotates coaxially with respect to, but also freely relative to the shaft 13. A drive belt 99 extends between an outer surface 100 of the drive ring 86 and a drive pulley 101 that is operably driven by the motor 33. The spreader pan 12 is thus rotatable independent from the diverter 11 and the receiver 10 on the shaft 13 under control of the motor 33. The motor 33 is in turn controlled by an operator through controller 35. The motor 33 is preferably a variable drive type motor so that it can be slowed or accelerated as needed to fill concentric annular rings of grain 6 or adjust for the level 7 of the grain 6 raising in the bin 3. The motors 33 and 34 can also preferably be stopped completely.

The embodiment shown in FIGS. 1 to 4 includes a pan 12 having a set of the eight vanes 110 to 117 that each abut the shaft 13 and extend therefrom at an angle of 45° relative to adjacent vanes. In the pan 12, the vane 110 is the shortest followed by vanes 111, 112, 113, 114, 115, 116 and 117 which each increase in length incrementally over the previous vane. The bottom plate 85 extends between each pair of vanes such as 110 113 and not beyond, except that the bottom 85 is mostly eliminated between the pair of vanes 110 and 116 and the pair of vanes 111 and 117. The bottom plate 85 is thus missing between the noted pairs of vanes to allow a certain amount of gain 6 to fall directly through the pan 12 without engaging the bottom plate 85, so as to provide a more even flow to the center of the bin 3. It was found by testing that removal of certain portions of the bottom plate 85, as shown, was preferable to provide an even distribution to the center of the bin 3.

A pair of ears 120 and 121 extend out slightly from the bottom plate 85 on the open side of the vanes 116 and 117 respectfully so as to provide better support to mount the respective vanes 116 and 117. The pan configuration shown in FIG. 4, while not exactly symmetrical, is comparatively balanced and follows a pattern wherein the shortest vane 110 is directly across from the next shortest vane 111 and so on, so as to better balance the device. The vanes 110 to 117 form a set wherein each is different in length and the length of each is determined by the previously noted formula, based on the angular difference between each vane of 45 degrees.

In use grain 6 is discharged from the tube 4 to the receiver 10 and flows therethrough to the diverter 11. The diverter 11 normally rotates comparatively slowly at about one to three revolutions per minute and discharges the grain 6 though the outlet opening 52 onto the spreader pan 12. The pan 12 normally rotates at a comparatively higher rate of speed (30 to 260 revolutions per minute and the speed may vary as the bin 3 is filled), preferably between 30 and 100 revolutions per minute. Grain 6 landing on the pan 12 either passes through between the vane pair 111 and 117, or vane pair 110 and 116, or alternatively strikes the pan bottom plate 85 and is eventually engaged by one of the vanes 110 to 117 which flings or projects the grain 6 radially outward into the bin 3. The outward momentum or velocity of particles of the grain 6 is related to length of the vane that strikes it, such that the particles struck by vane 110, if any, are thrown radially and tangentially outward the least and that struck by vane 117 is thrown outward the most. The pan 12 rotates clockwise. The speed of rotation of the pan 12 is preferably adjusted as the grain height 7 varies in the bin 3, so as to provide for continued even distribution.

If the grain 6 does not distribute evenly due to some outside effect, the spreader 1 can be manipulated to correct for problems. If a small region or angular sector of the bin has a low level compared to the remainder, the motor 34 can be stopped in a position ahead of the sector such that discharge grain 6 from the pan 12 falls mostly in the sector needing additional filling. Also if an annular ring of the gain (as seen from the top) is lower than other regions, rotation of the spreader pan 12 can be increased (to fill outer annular regions) or slowed (to preferentially fill central or inner annular regions) as necessary to adjust for unevenness in the top level 7 of the grain 6.

Shown in FIG. 5 is a first modified spreader pan 150 that may be substituted for the pan 12 and which rotates on a shaft 151. The pan 150 has a bottom 155 and a series of vanes 156 to 163 mounted on the bottom 155. The pan 150 differs mainly from the pan 12 in that there is a bottom segment 169 located between vanes 157 and 163. A spreader incorporating the pan 150, as is the case with the pans discussed below, functions generally in the some manner as the pan 12 of the previous embodiment with the exception that speed control must be used more with the pans 150 to control the flow of grain 6 to the center of the bin 3.

Shown in FIG. 6 is a is a second modified spreader pan 170. The pan 170 rotates on a shaft 171 and has a bottom 172 upon which a series of vanes 173 to 180 are mounted. The vanes 173 to 180 are mounted sequentially with respect to length at 45° relative to each other in a nautilis like pattern. The vanes 173 to 180 have lengths determined by the previously noted formula for doing so and in this embodiment have lengths of 9.9; 14; 17.1; 19.8; 22.1; 24.2; 26.2; and 28 inches respectively.

Shown in FIG. 7 is a third modified spreader pan 200. A series of vanes 202 to 225 is mounted on a pan bottom 226 so as to radiate outward in an increasing spiral formation. Each vane is separated from adjacent vanes by 15°.

Shown in FIG. 8 is a fourth modified grain spreader 250 mounted on a shaft 251 and having a bottom plate 252 upon which a set of radially extending vanes 253 to 276 is mounted. The vanes 253 to 276 are divided into two groups that includes sets of vanes of the same length. The vanes of the same length are located diagonally opposite each other. The groups are mounted on opposite sides of the bottom 252 so as to be balanced thereabout with the shortest vane of each group being first and then each longer vane in sequence.

It is noted within the invention that a single motor with gear reduction or the like may be utilized to rotate both the diverter and spreading pan in accordance with the invention.

It is also noted that the diverters shown in the illustrations have discharge outlets that are located entirely on one side of the axis of rotation and thus rotate essentially about the axis of rotation. In accordance with the invention the diverter discharge opening may be partially on both sides of the axis rotation and still rotate eccentrically such that more grain is always discharged on one side of the axis then the other during rotation.

While certain forms of the present invention have been illustrated and described herein, it is not to be limited to the specific forms or arrangement of parts described and shown.

What is claimed is:

1. A grain spreader comprising:
a) a vertical shaft
b) a diverter for receiving grain; said diverter being rotatable about said shaft and having a lower discharge opening positioned eccentrically relative to said shaft; said diverter including an elongate chute that has an upper opening that is generally coaxially located relative to said shaft such that said chute is at an angle relative to said shaft and such that said lower opening discharges grain in a ring when said diverter is rotating; and
c) a spreader pan being rotatable about said shaft and being located beneath said diverter discharge; said pan rotating during normal operations of said spreader at a faster rate of revolution compared to said diverter.

2. The spreader according to claim 1 wherein:
a) during normal operation said diverter is rotated in the range between about one and three revolutions and said pan is rotated in the range between about 30 and 260 revolutions per minute.

3. The spreader according to claim 1 including:
a) a receiver for operably receiving grain entering a bin and thereafter gravity distributing the grain to said diverter.

4. The spreader according to claim 1 including:
a) a first stoppable operator controllable motor linked to and operably controlling rotation of said diverter; and
b) a second variable speed operator controllable motor linked to and operably controlling rotation of said spreader pan independent of said first motor.

5. The spreader according to claim 1 wherein:
a) said chute constructs between the upper and lower openings thereof.

6. The spreader according to claim 1 wherein:
a) said chute lower opening includes an adjustable and pivotable choke adapted to allow an operator to vary the cross sectional size of said lower opening to operably control flow of grain there through.

7. The spreader according to claim 1 wherein:
a) said pan has a base with an upper generally planar surface and a series of vanes mounted on said surface so as to extend vertically upward from said base and so as to extend radially outward from near said shaft.

8. The spreader according to claim 7 wherein:
a) said vanes are a set wherein at least some of the vanes vary in length.

9. The spreader according to claim 8 wherein:
a) said vanes are positioned in sequence upon the base from shortest to longest.

10. The spreader according to claim 8 wherein:
a) the vanes are divided into at least two groups with each group being located in a different sector of said base and from smallest to largest within each group.

11. A grain spreader comprising:
a) a vertical shaft
b) a diverter for receiving grain; said diverter being rotatable about said shaft and having an elongate chute with a lower discharge opening positioned eccentrically relative to said shaft and an upper opening adapted to receive grain; said chute conveying between said upper opening and said lower discharge opening;

c) a spreader pan being rotatable about said shaft and located beneath said diverter discharge opening; said pan rotating during normal operations of said spreader at a faster rate of revolution compared to said diverter; and d) said pan having a upper planar surface with a plurality of vanes mounted on said surface so as to extend vertically upward from said surface and radially outward from near an axis of rotation of said pan.

12. The spreader according to claim 11 wherein:

a) at least some of said vanes have varying radial lengths.

13. In a grain spreader having a rotatable spreading pan, the improvement comprising:

a) said pan having a base with an upper generally planar surface with a set of vanes mounted thereon that extend radially from near a center of rotation of the pan and also extend generally vertically upward from said base; and said base not existing between at least a pair of said vanes so as to allow grain to pass through said pan without striking said base.

14. The spreader according to claim 13, wherein:

a) said set of vanes includes at least some vanes of different radial lengths and that are generally equally angularly spaced from each other.

15. In a grain spreader wherein grain is distributed on a rotating spreader pan; the improvement comprising:

a) a diverter positioned above said pan and operably rotated by a motorized drive; said diverter having an elongate chute that converges between a top and a bottom thereof; and b) said chute having an outlet opening rotating eccentrically relative to an axis of rotation of said diverter, so as to be adapted to discharge grain from said outlet opening in a circular pathway.

16. The grain spreader according to claim 15 wherein:

a) said diverter controls allow said diverter to be selectively fully stopped during spreading so as to operably allow grain to selectively fill one angular sector of a bin being filled by the grain.

17. A spreader pan for evenly distributing a particulate material comprising:

a) a base having an upper surface;

b) a plurality of elongate vanes arranged to extend radially from near a center of rotation of said base and to also extend generally vertically upward from said base; and wherein c) said vanes are sized such that the radius of each selected vane other than a vane of maximum length is determined by the angular position of the selected vane about the base by the formula such that the radius of each selected non maximum vane equals the radius of the said maximum length vane times the square root of the angle in degrees of the relative position of the respective vane compared to a starting position divided by the square root of A wherein A is selected from 360 degrees and 360 degrees divided by whole number groups of vanes.

18. The spreader according to claim 17, wherein:

a) A is 360 degrees.

19. The spreader according to claim 17 wherein:

The number of vanes is 8 and vanes that are closest in radial length are positioned opposite one another.

20. The spreader according to claim 17 wherein:

a) said vanes are arranged sequentially on said base according to size.

21. The spreader according to claim 17, wherein:

a) said vanes are sized in accordance with said formula and arranged on said base such that opposed vanes come as close as possible to balancing one another.

22. The spreader according to claim 17, wherein:

a) A is 180 degrees.

23. A grain spreader comprising:

a) a vertical shaft b) a diverter f or receiving grain; said diverter being rotatable about said shaft and having a discharge positioned eccentrically relative to said shaft;

c) a spreader pan being rotatable about said shaft and being located beneath said diverter discharge; said pan rotating during normal operations of said spreader at a faster rate of revolution compared to said diverter;

d) said pan has a base with an upper generally planar surface and a series of vanes mounted on said surface so as to extend vertically upward from said base and so as to extend radially outward from near said shaft;

e) said vanes are a set wherein at least some of the vanes vary in length; and f) the pan base except between the shortest and longest vanes generally extends between said vanes and not substantially radially beyond said vanes.

24. A grain spreader comprising:

a) a vertical shaft b) a diverter for receiving grain; said diverter being rotatable about said shaft and having a discharge positioned eccentrically relative to said shaft;

c) a spreader pan being rotatable about said shaft and being located beneath said diverter discharge; said pan rotating during normal operations of said spreader at a faster rate of revolution compared to said diverter;

d) said pan has a base with an upper generally planar surface and a series of vanes mounted on said surface so as to extend vertically upward from said base and so as to extend radially outward from near said shaft;

e) said vanes are a set wherein at least some of the vanes vary in length; and f) the pan base extends between said vanes except for between at least one pair where the pan base is at least partly missing so as to allow grain to pass directly through said pan without engaging said pan base.

* * * * *